United States Patent [19]

Pauliukonis

[11] 4,121,619
[45] Oct. 24, 1978

[54] TAPERED VALVES WITH CONICAL SEATS

[76] Inventor: Richard S. Pauliukonis, 6660 Greenbrier Dr., Cleveland, Ohio 44130

[21] Appl. No.: 600,515

[22] Filed: Jul. 30, 1975

Related U.S. Application Data

[63] Continuation of Ser. No. 312,888, Dec. 7, 1972, abandoned.

[51] Int. Cl.² .................. F16K 15/00; F16K 17/26
[52] U.S. Cl. ..................... 137/469; 137/493; 137/509; 137/516.25; 137/528
[58] Field of Search .......... 137/460, 462, 525, 533.17, 137/528, 529, 526, 516.29, 516.25, 516.27, 466, 509, 469; 251/16

[56] References Cited
U.S. PATENT DOCUMENTS

| | | | |
|---|---|---|---|
| 2,358,228 | 9/1944 | Hoof | 137/516.5 X |
| 2,755,816 | 7/1956 | Collins | 137/533.17 X |
| 2,949,929 | 8/1960 | Moore, Jr. et al. | 137/516.29 |
| 3,386,470 | 6/1968 | Goda et al. | 137/525 X |
| 3,540,472 | 11/1970 | Brady et al. | 137/516.29 |
| 3,677,286 | 7/1972 | Wolfson | 137/469 |
| 3,797,522 | 3/1974 | Carleton | 137/525 X |

Primary Examiner—Arnold Rosenthal

[57] ABSTRACT

A series of valves with tapered-conical seats including valves such as safety relief or self-regulating in-line check valves which operate without springs but by the use of self-holding tapers which firmly stay in place when seated, the angle of the taper varying between 0.5° to 45°, depending on the kind of material chosen and the valve type, TEFLON requiring a smaller angle for the same pressure holding capacity as conventional materials or other plastics, offering also valve design variations which include novel relief valves with springs and with self-relieving tapers, as well as shutoff valves with self-holding and self-relieving tapers operated by solenoids directly, and piloted valves, the valve series with conical seats, and improved sealing characteristics reduces dribble range while reference load is self-holding taper or a spring, and allows for reusable valves to replace safety rapture discs in some applications.

5 Claims, 11 Drawing Figures

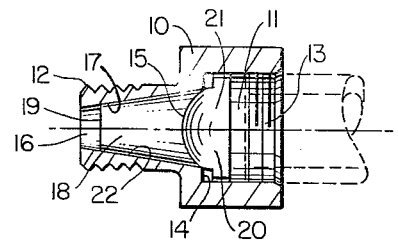
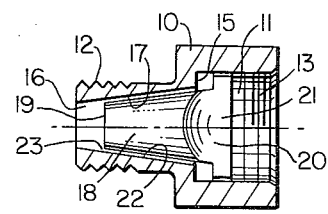
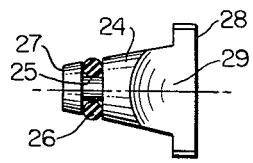
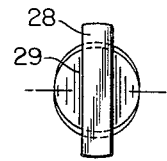
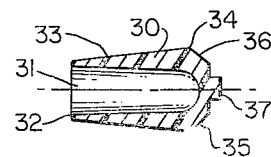
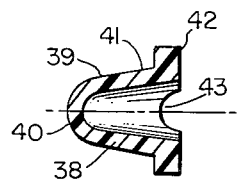
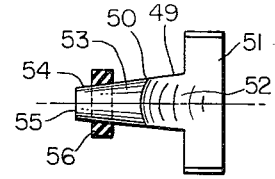
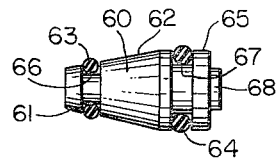
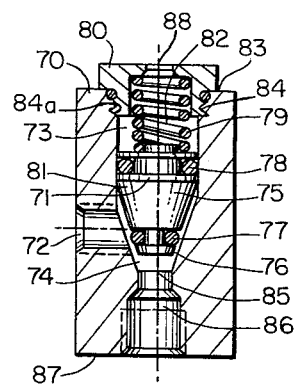
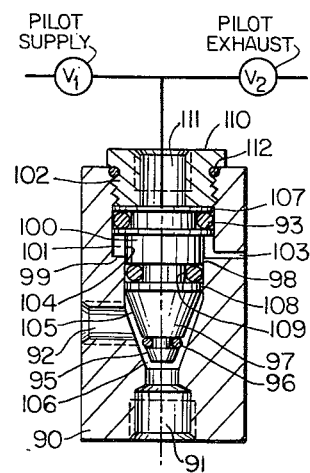
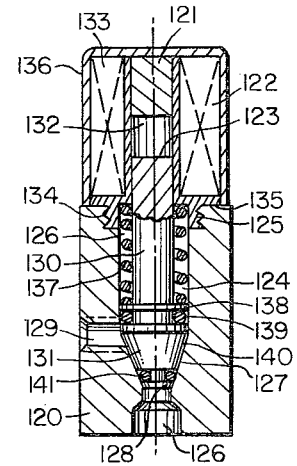

TAPERED VALVES WITH CONICAL SEATS

This is a continuation, of application Ser. No. 312,888, filed 12-7-72 now abandoned.

The present invention provides for valves with tapered-conical seats for the control of fluids such as required in many processes of chemical systems, instrumentation and research apparatuses, fluidic field and specialty equipment, and in water treatment and polution controls.

It has been established experimentally with various valves that valve designs may be simplified by the application of "SELF-HOLDING" tapers, primarily used in the machine tool industry for holding different cutting tools inside arbors because the tools with self-holding tapers stay in place owing to the small taper angles without any additional means of holding the shank in a socket during the operation of such tool in a specific machine.

In one case, an in-line check valve was made with a self-holding and locking tapered conical seat inside a valve housing, and a plug of identical tapered angle, resulting in an extremely simple self-regulating check-relief valve with the ability to both check and to relieve at pressure differentials identical to both valve ends, i.e. the pressure magnitude required for valve closing in one direction equals the pressure magnitude required to open the valve in the opposite direction of fluid flow, and such pressure applied to each valve and for closing or for opening fluid flow passages inside the valve in a self-regulating fashion varying from a minimum of a few inches of water to a pressure value of hundreds of pounds per square inch, and acting over the plug inside valve housing to operate automatically, valve-operating without fighting spring resistance force normally associated with existing check valves, and thereby eliminating energy waste to overcome such spring resistance, but more important, it operated without chatter and erratic operation associated with spring loaded check valves it existance. It also operated without excessive pressure drop spring loaded check valves normally yield making it impossible to employ conventional check valves in low pressure systems, as reported by instrument manufacturers that evaluated check valves of this invention with success.

In another application an identical valve as used for in-line check-relieving purpose was used to act as a simple safety valve in which self-holding taper acted as a spring, although no spring was employed for retention of plug inside tapered seat of this valve, to render valve bubble tight until system pressure reached a value larger than the resistance force of the mating tapered self-holding surfaces and to break the seal and to pop the valve open for a full fluid outflow from the valve exhaust port typifying extremely satisfactory safety valve operation with this rather simple springless two component valve with tapered seats subject to the present invention. By changing materials from metal to plastics and tapers accordingly it was found that this fundamental principle of tapered-conical seats of self-holding tapers can adequately serve as a self-regulating in-line check valve, as a safety valve, as a relief valve when spring was added to the plug for an automatic reseating after relieving overpressure, and even acting as a valve for different process controls by simple modification of such plug inside such tapered conical seat of a given valve housing to result in a series of NOVEL Valves of this invention without limitation to applications or pressures found in many systems. Exceptionally good test results with such valves can attest to the design superiority this invention offers. Obviously valves that operate with less pressure drop, offer versatility in application to various corrosive uses and permit retaining basically the same design principle of such valves to result in a simple, inexpensive, versatile, light weight and low cost valve is the most desirable feature in the control field.

These and other objects and advantages of the invention will become more fully apparent from the following description of the embodiment of the invention, taken together with the accompanying drawings.

IN THE DRAWINGS

FIG. 1-*a* is a cross section of a check-relief valve closed by a solid tapered plug inside tapered-conical seat of a valve housing bore, with plug representing a float of one design, inside a valve with a straight thru flow passage.

FIG. 1-*b* is a cross-section of a valve open and the plug unseated to permit a full fluid flow therethrough.

FIG. 2-*a* identifies a side view of a modified plug with seal inside appropriate groove of the tapered plug representing plug modification from that shown in FIG. 1-*a* and 1-*b*.

FIG. 2-*b* shows an end view of the plug of FIG. 2-*a* identifying a typical plug end with flats required for a free fluid flow through the valve assembled with such plug.

FIG. 3 is a cross section of a hollow plug with tapered surface and a cavity at the small taper representing another modification of float design.

FIG. 4 is a cross section of another design of hollow plug with cavity at larger plug tapered end.

FIG. 5 is a side view of a slightly tapered plug with stem provided with seal of rectangular cross-section slipped over the stem end as a further float modification.

FIG. 6 shows still another modification of the plug with one O-ring inside groove of the tapered plug end while another-inside groove of the straight section of a modified float however without flats for the plug to serve a valve with side exhaust.

FIG. 7 shows a valve and a springloaded plug with dual seal inside valve housing having inlet and exhaust port at right angles while the valve is open due to system pressure at the inlet exerting higher end forces than the resistance of spring.

FIG. 8 shows a valve with a plug having triple seals and a pilot supply-exhaust circuit including a plug suitable for pilot operation with mechanical advantage.

FIG. 9 identifies a normally closed valve with modified plug having dual seals and a stem for direct operation by a solenoid.

Shown in FIG. 1-*a* illustrating valve closed is a valve housing 10 having axially extending bore 11 with open female threaded receiver end 13 and a male thread 12 at the other housing end. The open end receiver 13 passes inwardly toward the housing male end and terminates with a shoulder 14 substantially midway therebetween. Bore 11 continues from shoulder 14 with a conical or tapered bore section 17 which tapers from its larger diameter 15 at shoulder 14 to smaller diameter 16 at the opposite male housing end thereby defining a taper angle between diameters or ends 15 and 16, the tapered bore section 17 further providing a seat therein comprising a part thereof and adaptable to receive a tapered plug 18.

The plug 18 having ends 19 and 20 interconnected, is tapered externally by the same angle as that of the conical bore section 17 to conform exactly to seat 22. When plug 18 is pressurized through open end 13, the fluid flow through the valve is shut-off, as shown in FIG. 1-a. When plug 18 is pressurized through small taper end 16, the fluid pressure unseats the plug from conical bore section 17 to open fluid flow passage inside bore 11 thereby resulting in plug 18 floating away from conical seat 22, as shown in FIG. 1-b.

In FIG. 1-a plug 18 is seated securely and held inside tapered bore section 17 by self-holding tapered seat 22, showing the fluid pressure acting upon the large plug end 20 to result in the valve shut-off condition which is maintained for as long as fluid does not change its direction and the plug end 20 experiences therein higher pressure than the plug end 19 which is not pressurized. Only when the direction of fluid flow changes and the plug 19 becomes energized by the fluid pressure entering valve housing 10 via small taper 16, the valve becomes open for fluid passage through bore 11 but only when such fluid pressure at plug end 19 approaches the pressure value of the shut-off pressure and the plug end 20 is not pressurized, at which time the friction of plug 18 inside conical bore section 17 is overcome to allow plug 18 to float away from its seat 22 toward the open receiver end 13. Pipe or tubing (dotted in) threaded into end 13 acts as a stop for controlling plug floating-away-distance while the male thread 12 connects to a similar pipe or tubing (not shown) permitting a simple means for valve ve incorporation into a circuit. This valve can serve as an IN-LINE Check Valve or it may serve as a SAFETY RELIEF Valve when provided with simple nipple inside female thread 13 to serve as atmospheric exhaust. Plug 18 inside conical bore 17 will be held in place by self-holding tapers without a spring, when preloaded properly by mechanical seating of mating tapers firmly to meet expected relief pressure requirements before popping open, to afford full discharge pressure such safety valves are to provide when protecting pressurized equipment.

FIG. 1-b shows valve open and plug 18 away from seat 22 forming an annular space 23 for fluid flow via bore 11 initiating at small diameter taper 16 and proceeding toward large diameter tapered end 15 to exhaust via housing open end with threads 13. Flats 21 at larger diameter plug end 20 permit unobstructed fluid exit out and away from the housing 10. The plug 18 of FIGS. 1-a & 1-b is made from solid plastic or metal and so is the valve housing 10. The material selection is controlled by the application and the corrosiveness of the fluids valved including environmental conditions and requirements.

Experiments with various valve housing materials as well as different plugs uncovering material dependent characteristics, necessitated modifying the solid plug design indentified in FIGS. 1-a and 1-b to assure proper sealing and relieving capabilities of valves in all applications.

It was established through tests that whereas a tapered plug with self-holding tapers inside conical housing bore entails sufficient self-holding and locking resistance force normally found between mating tapered surfaces of such designs when dealing with conventional materials of construction, with materials exhibiting slippery characteristics such as those found in TEFLON, this plug with selflocking resistance as well as self-holding taper required modifications by changing the angle of the taper in one case while in another case by simply changing plug materials or plug design for best results with various system pressures. Tapers with angles .5° to 45° were found useful here.

As a result of above findings, all of the valve requirements for sealing, and imparticular for controlled relieving of the plug inside conical valve body housing were satisfied by the following modifications of the solid plug 18 of FIGS. 1-a & 1-b.

FIG. 2-a identifies first of such plug modifications in a side view. It shows a plug 24 for valve actuation by floating inside valve housing 10 of FIGS. 1-a and 1-b but instead of having a solid plug, it has plug with seal 26 permanently secured inside appropriate groove 25 placed preferrably at the small taper end 27 with flats 29 at the large end 28 of plug 24. The modified plug 24 of FIG. 2-a is intended to serve not only low pressures where it proved to be most satisfactory during field tests but also in applications with TEFLON requiring increased frictionwith certain specific surface resistance-before relieving at higher pressures as well. Tapered plug 24 at higher pressures inside conical valve body seat would ideally conform to the tapered seat surface of the central bore of the housing to carry the end load while the seal would assist in sealing with a more definite insurance for a positive bubble tight seal during the valve operation as described while discussing FIG. 1-a and 1-b, irrespective of valve size.

FIG. 2-b clearly shows flats typical to such plugs as employed in valve operation as that described in FIGS. 1-a and 1-b where the fluid flow is axial, requiring that during the position change of said plug 24 inside housing 10 as shown in FIG. 1-b it would not block fluid exhaust via open housing end provided with female threads 13. Flats 29 in the plug and 28 positively insure this. Flats 29 of FIG. 2-b are identical to flats 21 of the plug 18 of FIGS. 1-a and 1-b in all respect. The seal 26 of FIGS. 2-a and 2-b may be of elastomer material compatible with fluids valved within the circuit of a specific system, or of plastics or other suitable materials chosen. With seal 26 of elastomer inside plug 24, and plug so assembled inside valve housing 10 of FIGS. 1-a and 1-b, it served as a check-relief valve during experimentation and in field testing in applications of system pressures as low as 8 inches of water. It would therefore idealy be suitable for use in laboratory instrumentation and Fluidics in one application although not limited to it as in another experiment it worked perfectly at pressures to 120 psig. Further, it was established that the plug with seal would also perform well with TEFLON, although not limited to it as it showed similar performance with Kel-F. It was concluded that although solid plug of FIGS. 1-a and 1-b is very satisfactory at higher pressures, a plug 24 with elastomeric seal is superior is lower pressure applications but not limited to it, covering a complete range as well. In fact, the unsealing of the plug was accompanied by identical pressure to that of sealing pressure at low and at high pressures when plug 24 was used inside Teflon housing 10. Further, an improved sealing and reduced dribble range, i.e. difference between cracking and leakage pressures found during experimentation with this valve pointed to the superiority of the basic principle of this valve as compared with conventional valves.

Because many applications of check-relief valves call for a rather large difference between sealing and unsealing pressures during valve operation, the plug was further modified to include control capability of plug relieving from its seat inside the valve housing after it was snugged therein by the sealing pressure of the fluid flowed therethrough during the change of directional flow from valve closed to valve open condition in accordance with FIGS. 1-a and 1-b, per FIG. 3 of modified plug.

FIG. 3 identifies a crossectional view of a plug made from elastomer material with plug body 30 hollow with its cavity 31 placed at the small taper 32 of the plug tapered surface 33, opposite to the large taper 34 of this plug, including reversed taper 35 at the plug large end 36 which terminates with protrusion 37 to serve as a stop during plug position change from that valve closed to that valve open position, and to allow free fluid flow out and away from the receiver threaded end 13 while the position of plug 30 changes from that shown in FIG. 1-a to that of FIG. 1-b. When plug 30 is seated inside valve housing conical bore 17 by the fluid entering housing end provided with female thread 13 and exerting pressure over the large plug end 36 in one direction to keep valve sealed, in the other direction when the flow direction changes the fluid will have to overcome the frictional resistance of the tapered surface 33 inside valve housing seat 22 before reestablishing free fluid flow through the check valve annular space 23 shown in FIG. 1-b. This resistance to unseat plug from the conical housing bore is larger when plug 33 is used in place of plugs 24 or 18 discussed earlier because plug 33 will enter housing bore 17 snugger by identical pressure closing valve shut while working over elastomeric large end 36 of the plug 33 in one direction, and subsequently, when the flow direction changes, the plug will be harder to unseat due to additional friction exerted over inner surfaces of the plug hollow cavity 31 to result in a combined plug resistance force considerably larger when plug 33 is used in lieu of plugs 24 and 18, and thus increasing the control capability of a check-relief valve of this invention.

For applications requiring extra sealing during valve closed condition another plug modification is introduced as shown by FIG. 4 illustrating a cross-section of a hollow plug 38 with tapered surface 39 and a rounded off small taper 40 opposite to large taper 41 terminating with large plug end 42 to act as a stop during the position change while floating inside the valve housing bore 17 of the housing 10 in operation from that closed position as shown in FIG. 1-a to that open position as shown in FIG. 1-b. Appropriate relief 43 at the large plug end 42 provides means for fluid flow when valve is in open position as that shown in FIG. 1-b, with end 42 abutting pipe and (not shown). Plug of FIG. 4 can be produced by molding from elastomer or plastic materials. Obviously, plug 38 will relieve at lower pressure than the pressure it can seal-off.

Experience with different plugs has shown that extremely satisfactory results in control capability of check-relief valve of this invention can be obtained by the use of self-regulating stem shown in FIG. 5 for service inside valve housing of FIGS. 1-a and 1-b, with a plug assembly 49 performing a check-relief valve function. Shown in FIG. 5 is a stem 50 provided with a large end 51 with flats 52 and an integral plug 53 terminating with a small taper 54 at the opposite small body end 55 made from one solid piece of metal or plastics so as to receive a seal 56 of rectangular cross-section slipped over the small taper 54 of the plug body end 55 far enough to seat tight over it for subsequent insertion of this plug assembly 49 into the valve housing 10 for valve operation seeking automatic positioning of seal during valve pressurization from various directions shown in FIGS. 1-a and 1-b. Upon fluid pressure from the direction that causes check valve to close, the large end 51 becomes energized by the fluid flowed from valve housing end provided with thread 13 of FIG. 1-a to keep plug assy. 49 tight inside the housing bore 17 which is conical and permits rather substantial preloading of the seal 56 which upon reversal of flow direction to that shown in FIG. 1-b renders ample resistance holding valve shut off until such time that the system pressure exceeds seal resistance force with resultant unseating of plug assembly from seat 22 inside conical bore 17 initiating fluid flow to proceed freely toward the exit end of the housing 10 provided with thread 13 satisfying all kinds of applications from rather low pressure to substantially higher pressures.

The unseating force of the plug from tapered self-holding seat by the system pressure acting in one direction, namely in the direction facing small tapered plug end was found to equal that of the valve sealing pressure in the opposite direction, i.e. plug seating force by the large plug end called reference load or the force opposing any pressure buildup in the opposite direction provided with small tapered plug end until plug relief pressure is reached, irrespective of material of construction be it brass, aluminum or plastics including slippery compounds such as Teflon or even Kel-F.

It is therefore noted that the valve of FIG. 1 can be employed not only as a check valve for in-line mounting but also as safety valve in some applications while in others it can be used in place of presently disposable safety rapture disc with new capability of subsequent reuse when plug is seated inside self-holding tapered conical valve body seat firmly by preloading plugs of designs identified in FIGS. 1, 2, 3, 4, or 5 in accordance with pressures such valves shall serve within respective systems in numerous applications, some requiring check-relief valve mounted in-line, some others requiring safety valve or rapture disc with atmospheric exhaust.

For applications that prohibit atmospheric exhaust such as found with relief valves requiring piped exhaust connected to a reservoir at lower pressure, the valve and the plug were further modified as follows:

FIG. 6 identifies a plug with dual O-ring for use with valves requiring piped exhaust such as that typically found in 2-way valves or shutoff valves. Shown in FIG. 6 is a plug 60 made from solid material one end of which terminates with small taper end 61 and the other end of which terminates with a round body 65 which in the illustrated case of FIG. 6 is shown with a raiser 68 for centering spring when assembled into a valve. A taper 62 comprises the opposite end to body 65. A peripheral groove 66 is provided inside taper 62 and another peripheral groove 67 is located inside straight body section 65 and substantially midway of diameter larger than the diameter of groove inside taper 62. Seals 63 and 64 are permanently secured inside their respective grooves of the plug 60. This plug 60 with its seals is intended to serve new valve housing with tapered conical seat of self-releasing taper as well in order to capitalize on an increased plug area to open the valve quickly by the additional force increase to increase lift of the plug. Depending on valve housing design, advantages may be made of the additional force to increase plug lift by utilization of the area difference between the small taper diameter of the plug which may be exposed to the system pressure and the area increase at the end of the taper provided with seal of larger diameter than the seal in the smaller diameter groove of the taper. As the valve opens further after initial seal cracking — due to frictional forces imposed by the fluid over the plug taper, the pressure drop across the seat decreases substantially, unless a spring is used as reference load at which time the momentary pressure drop across the seat would cause closing the valve, increasing the pressure across the seat and reopening valve in cycles, at phenomenon known to exist in valves with springs resulting in a chatter and hammering at frequencies that lead to premature wear. Increased taper angle of plugs including valve seats beyond that used with self-holding tapers is considered an advantage in valves with springs and piped exhaust. The addition of a second O-ring to the plug protects spring actuated values with reseating requirements as those found in relief valves. The addition of larger diameter O-ring 64 to the plug 60 of FIG. 6 in a valve as shown in FIG. 7 is directed to improvement of the conventional relief valve with spring is reference load. This was performed by more effective utilization of the additional force that acts over the taper of the plug when such plug is retaining larger diameter seal, and by improved load distribution over considerably larger surface of the mating tapers of those of the plug and the tapered conical seat of a valve housing with subsequent reduction of chattering frequency and of hammering effect with less pitting, abrasion and wear in the valve of this invention.

In FIG. 7 showing a valve of improved design for use as a relief valve but not limited to it as it may be used as a shutoff valve as well with plug 75 acting as valve control element to absorb the physical load inside tapered conical seat 74 while the seals 77 and 78 act as sealing members only, the spring 79 is used as a reference load. As can be seen from FIG. 7, a valve housing 70 of elongated configuration having an axially extending bore 73 with open receiver end 82 provided with female thread 84 at the housing end 83 to be closed by a cap 80 having corresponding male thread 84-a is provided with a port 86 at the other housing end. Bore 73 extending from open receiver end inwardly is provided with tapered-conical seat 74 small end of which terminates at 85 initiating with port 86 to exit at the opposite valve housing end 87. Port 72 enters conical seat 74 perpendicularly via side wall to provide fluid communication means through the housing proper initiating at port 86 to exit at port 72. Ports 86 and 72 may be threaded. Port 88 of cap 80 is an air vent.

A plug 75 is comprised of a larger diameter straight section 71 including appropriate peripheral groove for seal 78 provided therein at one end, at the other end of a tapered-conical end 81 with smaller taper 76 at the tip of the small cone, and a second peripheral groove retaining seal 77 along the taper. Plug 75 in all respects is identical to the plug 60 of FIG. 2 described earlier in a greater detail. Note that port 72 entering conical seat 74 in service is closed by seals 77 and 78 when plug 75 is seated inside seat 74 and as such entails a provision not found in the prior art valves; nowhere does the side port enter valve seat in a fashion this invention provides.

With the housing receiver end 82 open, the plug 75 including seals is slidably inserted into housing 70, and the housing is closed by a cap 80 when spring 79 is placed therein over the plug 75 larger straight end securing permanently by way of threads 84 and 84-a in final assembly of the valve. Simple spring adjustment (not shown) could be provided inside port 88 of cap 80 when port 88 is threaded. With port 86 connected to the pressurized fluid source and port 72 connected to a receiver at lower pressure, the valve will become operative when the source pressurize reaches the predetermined value of the compression spring setting for an automatic valve opening and subsequent discharge of excess fluid, for lowering system pressure, into the reservoir, with operating characteristics superior to those of the existing valves offering longer service life because of improvements cited earlier when discussing FIG. 6.

Additional advantage is realized by the fact that the spring of the valve of FIG. 7 is completely separated from the fluid valved at all times because of existance of the second larger diameter seal in the plug, providing capability with this valve to serve highly corrosive applications without undue deterioration of the spring normally in contact with such fluids preventing premature failure found in conventional valves. Spring separation from fluid pumped is another provision not found in valves of the prior art and it constitutes in itself an extremely important step in product improvement.

When self-holding tapers are used with this valve, its use is multiplied to such applications as a stand-by valve of a cryogenic vessel with capability to dump accumulated pressure initiating at port 72 via port 86 to a reservoir at lower presre with rather light spring force because of friction afforded by the self-holding tapers before lifting plug, and subsequently reseating at substantially lower pressure as is commonly required in such vessels. Such capabilities of this valve are not found in conventional valves at all. Fluid communication via route starting at port 72 and exiting through port 86 on the other hand will result in sooner valve opening due to the larger lift force generated over larger diameter seal 78 than if flowed via route starting at port 86 and exiting at port 72 described in detail when discussing relief valve operation. This is so because the pressure would exert less lift force when acting over small taper with seal 77. Consequently, another factor is appearing, important when evaluating valves; for applications requiring valve of a given design to open at lower pressure, port 72 may be used for valve actuation, or port 86 for applications requiring higher pressure service. Such versatility is definately an asset to valve operation and selection. Conventional valves do not possess such versatility at all. Other combinations in versatility of this valve include a removal of spring 79 to make this valve a pilot operated valve without any other modifications to the design of this valve. A simple addition of pipe or tubing line to the port 88 of cap 80 is all that is needed to make this valve a springless-pilot operated valve. Other changes of this valve can best be identified by the description that follows.

FIG. 8 shows a valve modification providing a plug with triple seals for use as a pilot operated valve with mechanical advantage on the pilot side where largest of the seals is employed. Shown in FIG. 8 is a valve housing 90 having an axially extending bore 100 with open receiver end 102 which is threaded and threaded opposite port 91. Bore 100 at its open end is enlarged inwardly toward housing axis by first large diameter opening 101 including side wall vent 103 communicating directly with opening 101 and a shoulder 99 at the end of opening 101 to continue inwardly with a second smaller diameter opening 104 which substantially midway of the bore 100 terminates with a tapered conical seat 105 with small taper 106 communicating with threaded port 91. Port 92 enters the tapered conical seat portion of the bore via side wall perpendicularly communicating directly with bore 100 and port 91. Note that here too like in FIG. 7 the side port 92 enters conical seat 105 directly to be sealed off in operation by valve plug seals, a feature not found in the prior art valve designs.

A valve plug 98 with triple seals and having a large diameter piston 107 including seal 93 inside appropriate groove at one end is provided with a tapered cone 97 terminating with small taper 95 including seal 96 inside appropriate groove at the other plug end. Between the piston 107 and the cone 97 there is a straight section 108 including seal 109 inside appropriate groove located adjacent to tapered cone 97. The diameter of large diameter piston 107 is slightly smaller than the diameter of opening 101 to facilitate sliding fit, and the diameter of straight section 108 is slightly smaller than the diameter of the second smaller diameter opening 104 to also facilitate sliding fit.

With receiver end 102 open, the valve plug 98 with triple seals is slidably inserted into housing 90, and the housing is closed by a pilot cap 110 including seal 122 and secured premanently therein. Port 111 in the pilot cap 110 is provided for fluid supply from and to pilot cap via circuit shown to actuate large diameter piston of the valve plug 98, and to float plug 98 during valve operation. In the illustrated case the port 111 is connected to the pilot supply system having valve 1 leading from pilot supply source and valve 2 leading to a pilot exhaust. With the valve 1 open and valve 2 closed, the port 111 is subject to the full pilot supply pressure which acts over the large diameter piston 107 to keep plug 98 down and seated inside conical seat 105 of the housing 90 and to render valve shut for as long as the pilot is energized and the pilot valve 2 is closed. Because of increased diameter of piston 107 as compared to the smaller diameters of seals 109 and 96, the pressure of the pilot supply may be reduced proportionally to that of the diametral ratio of seals 93 & 109 permitting pilot pressure of considerably lower value to counteract the pressure plug 98 experiences inside seat 105 resulting in a mechanical advantage for the operation of this valve by a pilot.

With the valve 1 closed and the valve 2 open, the port 111 experiences a drop of the pilot pressure down to substantially atmospheric pressure, and the plug 98 may be unseated from the conical seat 105 to render valve open for fluid communication between ports 91 and 92 of bore 100 of the housing 90 for as long as the valve 2 is open to atmosphere. Manipulating pilot valves 1 and 2 enables to alternatively close or to open valve fluid communication with ease due to the axial plug 98 position change inside housing bore 100 while floating accordingly therein.

With plug tapered cone having self-locking and holding angle, the operation of this valve will not be strictly dependent on the pilot pressure because the mechanical advantage present on the pilot side will enable implementation of various end forces to the larger piston of plug 98 by virtue of changing pilot pressure at will. Such implementation of end forces to the piston will preload tapered cone 97 inside housing seat 105 in accordance with angle selected for a specific valve design and ultimate frictional force such angle section yields.

Tapers of smaller angle will yield larger locking force between the plug cone 97 inside housing conical seat 105 and may be as low as ½° included angle or higher, depending on the materials of construction, with slippery material requiring much lower taper angle for a given service pressure than that required for conventional materials. Preloading tapers for different locking or frictional force of the plug inside valve seat by the pilot of varying pressure magnitudes provides valve design of unparralelled versatility unheard of with conventional design valves, and as such offering novel valves subject to this invention.

Valve of FIG. 8 can be considered normally open, because unless the pilot is energized, the plug 98 will be unseated by the pressure of the fluid valved when tapers are self-relieving, because in practice one normally avoids systems that depend on constant pressure inside pilot lines as such pressure with time may dissipate for many reasons, the leak in pressurized line being the most common cause for losing pilot pressure. Therefore, for applications that require normally closed valves, the existing practice dictates the use of a spring to back up large piston for seating inside valve housing seat and rendering valve closed without the use of pilot as a biasing force, unless self-holding tapers were selected for such valve, at which time valve operation would approach conditions described above. Obviously, self-relieving tapers if chosen for tapered valve components including a spring for the valve shown in FIG. 8 would render this valve operative as a two-way normally closed valve with operating characteristics already covered by FIG. 7, augmenting versatility of this valve further as there is no valve design in existance offering such flexibility, to the best knowledge of this inventor. To top it, valve of FIG. 8 can be made as a pilot operated two-way valve even with self-relieving tapers by connecting pilot supply circuitry to the vent port 103, and operated as a normally closed valve with spring of FIG. 7 holding plug 98 in the seat 105 of housing 90 of the valve of FIG. 8 until pilot pressure entering via port 103 becomes energized unseating plug and rendering valve open, or vice versa.

FIG. 9 further identifies versatility in valve adaptation to a modification without departing form the basic principle this invention entails.

Shown in FIG. 9 is a valve housing 120 having an axially extending bore 124 there through with open receiver end 125 which is threaded at 134 and threaded opposite port end 126. The open receiver end 125 passes inwardly toward the housing opposite port end 126 partway, interconnecting at the innermost end a reduced diameter bore section 142 which continues toward the port end 126 a substantial part therethrough terminating substantially midway therebetween with a tapered conical seat 127 of which the small taper 128 communicates with threaded port end 126. A port 129 enters conical seat 127 via side wall perpendicularly for communication with bore 124 end of which is provided with port 126. Here again it is to note that the side port 129 entering seat 127 perpendicularly is not only identical to the side port in FIGS. 7 and 8 but in it represents novel means not found in valves of prior art:entering seat perpendicularly is a proprietory art of this invention, unique for FIGS. 7, 8 and 9.

An elongated plug member 130 having a plug member head 138 with dual seals 139 and 141 at one end and a long stem 123 at the other end shows a plug cone 131 of head 138 tapered at 140 on an angle identical to the angle of seat 127 and firmly seated therein identifying valve in a closed bubble tight position. Spring 137 abutting plug member head 138 at one end and appropriate recess of base 135 at the other end in the illustrated case of FIG. 9 keeps this valve normally closed. A solenoid 133 with a threaded base 135 having a gap 132 is secured inside open receiver end 125 over the stem 123 so as to have the solenoid iron 121 face stem 123. A solenoid coil 122 surrounding both the iron 121 and the stem 123 is situated over the base 135 under a cover 136. When coil 122 is energized by an electric current, the iron 121 magnetizes to essentially pill-in stem 123 to close the gap 132 shown in FIG. 9. By necessity the stem end must be made from magnetic material in order to ascertain the operation and valve opening by solenoid 133, when such magnetic iron pulls-in stem 123 unseating the plug cone 131 from seat 127 for flow initiation thorugh the valve.

In operation the normally closed valve condition shown in FIG. 9 can be changed by energizing solenoid coil to exert enough pull over the stem end and to open the valve by lifting plug member 130 out of the seat 127. Flow communication between ports 126 and 129 will be maintained for as long as as the solenoid is energized. Upon deenergization of the solenoid the spring returns plug member into the original valve closed condition shown in the FIG. 9. FIG. 9 clearly shows the advantages present with valve design of this invention, imparticular, of the versatility of the basic principle of the tapered-conical seat valves to be used as a check-relief valve, a safety relief valve, with a straight through flow passage, a relief or simple shut-off valve having a side port inside tapered valve seat with unlimited variations in actuation means be it self-controlled by the fluid pressure, spring loaded, pilot operated or direct solenoid operated, all possible because of novel approach to the valving problem offering simple solutions described in the above specification in great detail.

The invention is not restricted to the slavish imitation of each and every one of the details described above which have been set forth merely by way of example with the intent of most clearly setting forth the teachings of the invention. Obviously, devices may be provided which change, eliminate, or add certain specific structural or procedural details without departing from the invention.

What is claimed is:

1. A fluid valve for selectively porting pressurized fluid between a source and a receiver comprising:

a valve housing having first and second ends interconnected by a bore extending therethrough including at least a pair of interconnecting ports, one of said bore ends comprising at least one of said ports, a valving means in said housing movable between a first position blocking fluid communication between said ports and a second position allowing fluid communication between said ports, a fluid operable means urging said valving means to assume at least one of said positions therein, said valving means including a linearly extending valve seat which tapers inwardly from its smaller diameter to larger diameter at an angle inside said housing bore adjacent a first of said ports comprising a part thereof, said valving means further including an axially movable tapered plug cone having a linearly extending surface between smaller and larger diameters thereof on an angle, including plug sealing means when said valving means is in said first position, said angle between said smaller and larger taper diameters of said valve seat and said tapered plug cone selected from a group of self-holding tapers, said sealing means including a taper small enough to hold said tapered plug in said valve seat purely by friction necessitating said fluid operable means to exert a pressure force larger than the friction force of said self-holding tapers, resulting in sudden popping of said tapered plug cone to enable said valving means to assume said second position allowing fluid communication between said ports at full rated capacity, including means for selectively opening and closing fluid flow therethrough by application of substantially equal predetermined pressure to opposite ends of said valve housing comprising the first and the second interconnecting ports thereof while said valving means located therebetween is movable from said second position when pressure is applied through said second interconnecting port to said first position and vice versa whereas a first valve closed position is attainable when said tapered plug cone is moved to be seated inside said valve seat causing said self-holding tapers to engage frictionally while a second valve open position is attainable only when flow direction reverses and the pressure force magnitude increases to correspond to the force that moved said tapered plug to engage said valve seat while acting from the opposite direction, until said tapered plug cone is forced to pop open allowing fluid communication between said ports at full rated capacity providing thereby means for a directional flow control, wherein said valving means manifest purely friction dependent operation in which a resistance developed between mating surfaces of said valve seat and said tapered plug cone provides a force balanced self-regulated plug shifting from one of said positions to another of said positions when pressure force and the direction of fluid flow changes therein, affording fluid checking in one direction and fluid relieving in another direction.

2. A fluid valve for selectively porting pressurized fluid between a source and a receiver comprising:

a valve housing having first and second ends interconnected by a bore extending therethrough including at least a pair of interconnecting ports, one of said bore ends comprising at least one of said ports, a valving means in said housing movable between a first position blocking fluid communication between said ports and a second position allowing fluid communication between said ports, a fluid operable means urging said valving means to assume at least one of said positions therein, said valving means including a linearly extending valve seat which tapers inwardly from its smaller diameter to larger diameter at an angle inside said housing bore adjacent a first of said ports comprising a part thereof, said valving means further including an axially movable tapered plug cone having a linearly extending surface between smaller and larger diameters thereof on an angle, including plug sealing means when said valving means is in said first position, said angle between said smaller and larger taper diameters of said valve seat and said tapered plug cone selected from a group of self-holding tapers, said sealing means including a taper small enough to hold said tapered plug in said valve seat purely by friction necessitating said fluid operable means to exert a pressure force larger than the friction force of said self-holding tapers, resulting in sudden popping of said tapered plug cone to enable said valving means to assume said second position allowing fluid communication between said ports at full rated capacity, including means for selectively opening and closing fluid flow therethrough by application of substantially unequal pressures and forces to opposite ends of said valve housing comprising the first and the second interconnecting ports thereof while said valving means located therebetween is urged to move from one of said positions to another of said positions, including force unbalanced friction dependent operation wherein said tapered plug cone includes a portion which is hollow.

3. A fluid valve for selectively porting pressurized fluid between a source and a receiver comprising:

a valve housing having first and second ends interconnected by a bore extending therethrough including at least a pair of interconnecting ports, one of said bore ends comprising at least one of said ports, a valving means in said housing movable between a first position blocking fluid communication between said ports and a second position allowing fluid communication between said ports, a fluid operable means urging said valving means to assume at least one of said positions therein, said valving means including a linearly extending valve seat which tapers inwardly from its smaller diameter to larger diameter at an angle inside said housing bore adjacent a first of said ports comprising a part thereof, said valving means further including an axially movable tapered plug cone having a linearly extending surface between smaller and larger diameters thereof on an angle, including plug sealing means when said valving means is in said first position, said angle between said smaller and larger taper diameters of said valve seat and said tapered plug cone selected from a group of self-holding tapers, said sealing means including a taper small enough to hold said tapered plug in said valve seat purely by friction necessitating said fluid operable means to exert a pressure force larger than the friction force of said self-holding tapers, resulting in sudden popping of said tapered plug cone to enable said valving means to assume said second position allowing fluid communication between said ports at full rated capacity, including means for selectively opening and closing fluid flow therethrough by application of substantially unequal pressures and forces to opposite ends of said valve housing comprising the first and the second interconnecting ports thereof while said valving means located therebetween is urged to move from one of said positions to another of said positions, including force unbalanced friction dependent operation wherein said tapered plug cone includes at least one elastomer seal inside a peripheral groove thereof.

4. A fluid valve for selectively porting pressurized fluid comprising:

a valve housing having a main inlet and an outlet ports in a housing bore thereof, a tapered valve seat adjacent said inlet port and integral to said bore, a valve incorporated therein and comprising an axially movable tapered plug adaptable to be shifted from a first valve closed position wherein said plug is engaged inside said tapered seat to a second valve open position wherein said plug is disengaged from said tapered seat, and wherein when said plug is inside said tapered seat, fluid communication between said inlet and outlet ports is closed, while when said plug is shifted to disengage from said tapered seat, fluid communication between said inlet and outlet ports is established, said valve seat and said plug having selfholding tapers, including a fluid operable means for shifting said plug to assume at least one of said positions therein, whereas said first valve closed position is established when said plug is forced into said valve seat to engage frictionally therein while said second valve open position is established only when said fluid operable means develps a force of a magnitude larger than said frictional force prevailing, urging said plug to pop open and allow fluid communication between ports at full rated flow, providing a unidirectional flow valve to serve as a pressure relief device wherein said main inlet port enters said housing bore perpendicularly through a side wall directly into said tapered valve said, including at least one elastomer seal inside a peripheral groove of said plug.

5. A fluid valve for selectively porting pressurized fluid comprising:

a valve housing having a main inlet and an outlet ports in a housing bore thereof, a tapered valve seat adjacent said inlet port and integral to said bore, a valve incorporated therein and comprising an axially movable tapered plug adaptable to be shifted from a first valve closed position wherein said plug is engaged inside said tapered seat to a second valve open position wherein said plug is disengaged from said tapered seat, and wherein when said plug is inside said tapered seat, fluid communication between said inlet and outlet ports is closed, while when said plug is shifted to disengage from said tapered seat, fluid communication between said inlet and outlet ports is established, said valve seat and said plug having selfholding tapers, including a fluid operable means for shifting said plug to assume at least one of said positions thereof, whereas said first valve closed position is established when said plug is forced into said valve seat to engage frictionally therein while said second valve open position is established only when said fluid operable means develps a force of a magnitude larger than said frictional force prevailing, urging said plug to pop open and allow fluid communication between ports at full rated flow, providing a unidirectional flow valve to serve as a pressure relief device wherein said valve closing is performed automatically by a biasing force of a compression spring rated substantially below of said force said fluid operable means provide to one of said plug ends when said plug is in said first valve closed position frictionally engaged, said biasing force acting in the direction opposite to the direction said force of said fluid operable means acts, said biasing force capable of reseating said plug at the end of overpressure relief, said biasing force being substantially lower in magnitude to the force said fluid operable means provides for popping of said plug is sufficiently large to provide the original frictional force to said self-holding tapers for a reapeated operation without hysterisis.

* * * * *